United States Patent [19]
Thompson

[11] Patent Number: 5,151,127
[45] Date of Patent: Sep. 29, 1992

[54] WEATHER RESISTANT, FIRE RETARDANT PRESERVATIVE AND PROTECTIVE COMPOSITIONS FOR THE TREATMENT OF WOOD AND CELLULOSE PRODUCTS

[76] Inventor: Duncan C. Thompson, Box 201, Lethbridge, Alberta, Canada, T1J 3Y5

[21] Appl. No.: 617,783

[22] Filed: Nov. 26, 1990

[51] Int. Cl.$^5$ .................................................. C09D 5/00
[52] U.S. Cl. ............................ 106/15.05; 106/18.11; 106/18.13; 106/18.14; 106/18.15; 106/18.18; 106/18.21; 106/18.22; 106/18.3; 106/18.31; 106/18.32; 106/18.33
[58] Field of Search ............... 106/15.05, 18.11, 18.13, 106/18.14, 18.3, 18.31, 18.15, 18.18, 18.21, 18.22, 18.32, 18.33

[56] References Cited

U.S. PATENT DOCUMENTS

| | | | |
|---|---|---|---|
| 2,526,083 | 10/1950 | Nielsen | 106/18.13 |
| 4,224,169 | 9/1980 | Retana | 106/18.13 |
| 4,461,721 | 7/1984 | Goettsche et al. | 106/18.13 |
| 4,514,327 | 4/1985 | Rock | 106/18.13 |
| 4,529,467 | 7/1985 | Ward et al. | 106/18.13 |

FOREIGN PATENT DOCUMENTS

| | | | |
|---|---|---|---|
| 584717 | 10/1959 | Canada | 106/18.13 |
| 2724604 | 12/1978 | Fed. Rep. of Germany | 106/15.05 |
| 53-045903 | 12/1978 | Japan | 106/15.05 |
| 59-172405 | 9/1984 | Japan | 106/15.05 |
| 59-227802 | 12/1984 | Japan | 106/15.05 |

Primary Examiner—William R. Dixon, Jr.
Assistant Examiner—Anthony J. Green
Attorney, Agent, or Firm—Gunn, Lee & Miller

[57] ABSTRACT

Fire retardation and wood preservation compositions having inorganic salts encapsulated by a water-based acrylic resin solution. The salts are carried by water into the wood or cellulose product to be treated. After the water evaporates, the inorganic salts are retained in the treated wood and not leached from or washed out of the wood product. The component compounds of the compositions are mixed in specific sequences to avoid coagulation of the mixture.

9 Claims, No Drawings

WEATHER RESISTANT, FIRE RETARDANT PRESERVATIVE AND PROTECTIVE COMPOSITIONS FOR THE TREATMENT OF WOOD AND CELLULOSE PRODUCTS

BACKGROUND AND OBJECT OF THE INVENTION

There have been numerous fire retardant formulations and many wood preservatives developed up to this time. Much work has been done with borates in the area of wood preservation and with sulfates, phosphates, urea and magnesium chloride in the area of fire retardants. However, until the development of the compositions set forth herein, there has not been developed a composition that combines the properties of being both an effective wood preservative and fire retardant with resistance to weather and leaching.

DISCLOSURE OF THE INVENTION

A. Objectives of the Invention

The objective of this invention is to provide several chemical compositions which are easily, cheaply and safely applied to wood or cellulose products, which are suitable for exterior use and which combine the functions of preserving and protecting wood and cellulose products against deterioration due to molds, fungi, insects, weather, fire and flame.

B. Summary of the Invention

The invention consists of nine combinations of various of the following compounds: Borax, Boric Acid, Boric Oxide, Urea, Magnesium Chloride, Ammonium Polyphosphate Solution, Ammonium Thiosulphate Solution and Triethylamine in an acqueous solution mixed with the specific Acrylic Resin compatible to the compounds. These compositions are applied to wood and cellulose products by spraying, brushing, rolling, pouring dipping immersing or pressure impregnation, depending on the material being treated and the purpose for which it is intended.

There are nine combinations of these chemical compounds in this invention, forming nine different useful compositions of matter. The nine combinations have slight variations from each other designed to maximize performance for different particular applications. All variations are water based and utilize the specific Acrylic Resin in each composition.

The water portion of the composition acts only as a carrier and is intended to evaporate after application. This evaporation must be complete before the composition is exposed to weather or to fire.

The inclusion of the specific Acrylic Resin to the composition prevents the other chemical compounds, which are normally water soluable, from leaching or washing out of the wood or cellulose products after application. After complete drying, the composition will bind and adhere to the wood or cellulose products and exposure to water or moisture will only cause the composition to swell in size rather than return to an acqueous solution.

DETAILED DESCRIPTION OF THE INVENTION

The following is a list of components to the various compositions and the range in which they appear in this patent set forth in parts by weight per thousand.

| COMPONENT | PARTS BY WEIGHT PER THOUSAND Range: |
|---|---|
| Solids: | |
| Boric Acid | 30–60 |
| Borax | 50–80 |
| Boric Oxide | 100 |
| Urea | 100 |
| Magnesium Chloride | 20–40 |
| Liquids: | |
| Ammonium Polyphosphate Solution | 50–100 |
| Ammonium Thiosulphate Solution | 50–100 |
| Triethylamine | 10 |
| Acrylic Resin | 50–100 |
| Water | 690–790 |

By way of explanation, the Ammonium Polyphosphate Solution referred to throughout this application is a pre-manufactured blend of the following chemicals:

| CHEMICAL | PERCENT (%) BY WEIGHT |
|---|---|
| a) Phosphate ($P_2O_5$) | |
|    i) as Polyphosphate | 23.12 |
|    ii) as Orthophosphate | 10.88 |
| b) Ammoniacal Nitrogen (N) | 10.00 |
| c) Potassium monoxide ($K_2O$) | 0.10 |
| d) Sulphur tetroxide ($SO_4$) | 2.00 |
| e) Magnesium oxide (MgO) | 0.25 |
| f) Calcium oxide (CaO) | 0.07 |
| g) Zinc oxide (ZnO) | 0.08 |
| h) Manganese oxide (MnO) | 0.02 |
| i) Iron (III) oxide ($Fe_2O_3$) | 0.40 |
| j) Copper (II) oxide (CuO) | 0.005 |
| k) Boron (B) | 0.01 |
| l) Flourine (F) | 0.20 |
| m) Water ($H_2O$) | 52.865 |
| TOTAL | 100.000 percent |

By way of additional explanation, the Ammonium Thiosulphate Solution referred to throughout this application is a pre-manufactured blend of the following chemicals to arrive at the following chemical formula [$(NH_4)_2S_2O_3$]:

| CHEMICAL | PERCENT (%) BY WEIGHT |
|---|---|
| a) Ammoniacal Nitrogen | 12.0 |
| b) Sulphur | 26.0 |
| c) Water | 72.0 |
| TOTAL | 100.0 percent |

By way of additional explanation, the Borax referred to throughout this application is Sodium Tetraborate Pentahydrate [$Na_2B_4O_7 5H_2O$] commonly sold by manufacturers as Borax 5 Mol. This compound is used here in its granular or powdered form and comprises the following chemicals:

| CHEMICAL | PERCENT (%) BY WEIGHT |
|---|---|
| a) Sodium Oxide ($Na_2O$) | 21.28 |
| b) Boric Oxide ($B_2O_3$) | 47.80 |
| c) Water by Crystalization ($H_2O$) | 30.92 |
| TOTAL | 100.00 percent |

By way of additional explanation, the Boric Acid referred to throughout this application is Orthoboric Acid (H BO). It is employed here in its powdered or granulated form and comprises the following chemicals:

| CHEMICAL | PERCENT (%) BY WEIGHT |
| --- | --- |
| a) Boric Oxide ($B_2O_3$) | 56.30 |
| b) Water by Crystalization | 43.70 |
| TOTAL | 100 percent |

By way of additional explanation, the Boric Oxide referred to throughout this application is Disodium Octaborate Tetrahydrate and is a premanufactured compound produced by United States Borax and Chemical Corporation under U.S. Pat. No. 2,998,310 and having a chemical formula of $Na_2B_8O_{13}\text{-}4H_2O$.

By way of additional explanation, the Magnesium Chloride referred to throughout this application has a chemical formula of $MgCl_2$ and is employed in its flaked or granular form.

By way of additional explanation, the Urea referred to throughout this application has a chemical formula of $CO(NH_2)_2$ and is employed in its granular form.

By way of additional explanation, the Triethylamine referred to throughout this application has a chemical formula of $(C_2H_5)_3N$ and is employed in its liquid form.

By way of additional explanation, the specific Acrylic Resin referred to throughout this application is a pre-manufactured water base resin solution composed of the following chemicals, and is employed in its liquid form.
a) Styrene (phenylethene)—$C_6H_5CH{:}CH_2$
b) Acrylic Acid (propenoic acid)—$CH_2{:}CHCOOH$
c) Hydroxymethylacrylate—$CH{:}CHCOOCH_3OH$
d) Ethylene Glycol—$CH_2OHCH_2OH$
e) Dimethylaminoethanol—$(CH_3)_2NCH_2CH_2OH$
f) Ammonia—$NH_4$
g) Water—$H_2O$ The following are formulas for the blending of the aforementioned chemical compounds to produce the variety of compositions which constitute this invention. The components for each composition are expressed as parts by weight per thousand whether they be in pre-manufactured solutions or granular/powdered form. The mixing instructions following the various compositions should be followed strictly. Deviation from the order of mixing or the amount of the component part could easily cause coagulation of the mixture rendering the same ineffective.

| COMPOSITION I | |
| --- | --- |
| Compound | PARTS BY WEIGHT PER THOUSAND |
| Borax | 50 |
| Boric Acid | 30 |
| Urea | 100 |
| Magnesium Chloride | 20 |
| Acrylic Resin | 75 |
| Triethylamine | 10 |
| Water | 715 |
| | 1,000 |

Mixing instructions: The Borax, Boric Acid, Urea and Magnesium Chloride, all in powder/granular form, are mixed together and then dissolved completely in the water. Only after the granular compounds, particularly the Magnesium Chloride, have completely dissolved in the water should the Triethylamine and the Acrylic Resin be mixed thoroughly throughout the solution. For best results, the Acrylic Resin should be added as near to the time of application to the wood or cellulose products as possible.

| COMPOSITION II | |
| --- | --- |
| Compound | PARTS BY WEIGHT PER THOUSAND |
| Borax | 50 |
| Boric Acid | 30 |
| Ammonium Thiosulphate | 100 |
| Ammonium Polyphosphate | 50 |
| Acrylic Resin | 75 |
| Water | 695 |
| | 1,000 |

Mixing Instructions: The Ammonium Thiosulphate Solution and the Ammonium Polyphosphate Solution are first mixed together with the water. The Borax and Boric Acid are then dissolved completely into this solution. The Acrylic Resin is similarly to be completely blended in the solution. For best results, the Acrylic Resin should be added as near to the time of application to the wood or cellulose products as possible.

| COMPOSITION III | |
| --- | --- |
| Compound | PARTS BY WEIGHT PER THOUSAND |
| Borax | 60 |
| Boric Acid | 40 |
| Ammonium Thiosulphate | 100 |
| Magnesium Chloride | 20 |
| Acrylic Resin | 75 |
| Water | 705 |
| | 1,000 |

Mixing Instructions: The Ammonium Thiosulphate is first added to the of water. To this are then added the Borax, Boric Acid and Magnesium Chloride. These granular compounds must be completely dissolved in the solution. The Acrylic Resin is then mixed thoroughly throughout the solution. For best results, the Acrylic Resin should be added as near to the time of application to the wood or cellulose products as possible.

| COMPOSITION IV | |
| --- | --- |
| Compound | PARTS BY WEIGHT PER THOUSAND |
| Borax | 60 |
| Boric Acid | 40 |
| Urea | 100 |
| Triethylamine | 10 |
| Acrylic Resin | 100 |
| Water | 690 |
| TOTAL | 1,000 |

Mixing instructions: The Borax, Boric Acid and Urea, all in powder/granular form, are mixed together and then dissolved completely in the water. Only after the granular compounds have completely dissolved in the water should the Triethylamine and the Acrylic Resin be mixed thoroughly throughout the solution. For best results, the Acrylic Resin should be added as near to the time of application to the wood or cellulose products as possible.

COMPOSITION V

| Compound | PARTS BY WEIGHT PER THOUSAND |
| --- | --- |
| Borax | 80 |
| Boric Acid | 60 |
| Ammonium Thiosulphate | 50 |
| Triethylamine | 10 |
| Acrylic Resin | 70 |
| Water | 730 |
| TOTAL | 1,000 |

Mixing instructions: The Ammoniumm Thiosulphate is first added to the water. The Borax and Boric Acid are then added and mixed until completely dissolved. The Triethylamine and the Acrylic Resin are then added and mixed thoroughly throughout the solution. For best results the Acrylic Resin should be added as near to the time of application to the wood or cellulose products as possible.

COMPOSITION VI

| Compound | PARTS BY WEIGHT PER THOUSAND |
| --- | --- |
| Borax | 80 |
| Boric Acid | 60 |
| Triethylamine | 10 |
| Acrylic Resin | 100 |
| Water | 750 |
| TOTAL | 1,000 |

Mixing instructions: The Borax and Boric Acid are first dissolved completely in the water. The Triethylamine and the Acrylic Resin are then added and mixed thoroughly throughout the solution. For best results, the Acrylic Resin should be added as near to the time of application to the wood or cellulose products as possible.

COMPOSITION VII

| Compound | PARTS BY WEIGHT PER THOUSAND |
| --- | --- |
| Borax | 60 |
| Boric Acid | 30 |
| Ammonium Polyphosphate | 100 |
| Acrylic Resin | 60 |
| Water | 750 |
| TOTAL | 1,000 |

Mixing instructions: The Ammonium Polyphosphate is first added to the water. The Borax and the Boric Acid are then completely dissolved in the solution. Next, the Acrylic Resin is added and mixed thoroughly throughout the solution. For best results, the Acrylic Resin should be added as near to the time of application to the wood or cellulose products as possible.

COMPOSITION VIII

| Compound | PARTS BY WEIGHT PER THOUSAND |
| --- | --- |
| Borax | 80 |
| Boric Acid | 60 |
| Magnesium Chloride | 40 |
| Triethylamine | 10 |
| Acrylic Resin | 75 |
| Water | 735 |
| TOTAL | 1,000 |

Mixing instructions: The Borax, Boric Acid and Magnesium Chloride are first dissolved completely in thde water. The Triethylamine and the Acrylic Resin are then mixed thoroughly throughout the solution. For best results, the Acrylic Resin should be added as near to the time of application to the wood or cellulose products as possible.

COMPOSITION IX

| Compound | PARTS BY WEIGHT PER THOUSAND |
| --- | --- |
| Boric Oxide | 100 |
| Triethylamine | 10 |
| Acrylic Resin | 100 |
| Water | 790 |
| TOTAL | 1,000 |

Mixing instructions: The Boric Oxide is dissolved completely in the water. The Triethylamine and the Acrylic Resin are then mixed thoroughly throughout the solution. For best results, the Acrylic Resin should be added as near to the time of application to the wood or cellulose products as possible.

What is claimed is:

1. A fire retardation and wood preservation composition comprising the following ingredients in the approximate amounts indicated:

| Compound | Parts by weight per thousand |
| --- | --- |
| Borax | 50 |
| Boric acid | 30 |
| Urea | 100 |
| Magnesium chloride | 20 |
| A water-based acrylic resin solution furthur comprising styrene, acrylic acid, hydroxymethylacrylate, ethylene glycol, dimethylaminoethanol, ammonia, and water | 75 |
| Triethylamine | 10 |
| Carrier water | 715 |

2. A fire retardation and wood preservation composition comprising the following ingredients in the approximate amounts indicated:

| Compound | Parts by weight per thousand |
| --- | --- |
| Borax | 50 |
| Boric acid | 30 |
| Ammonium Thiosulphate | 100 |
| Ammonium Polyphosphate | 50 |
| A water-based acrylic resin solution further comprising styrene, acrylic acid, hydroxymethylacrylate, ethylene glycol, dimethylaminoethanol, ammonia, and water | 75 |
| Carrier water | 695 |

3. A fire retardation and wood preservation composition comprising the following ingredients in the approximate amounts indicated:

| Compound | Parts by weight per thousand |
|---|---|
| Borax | 60 |
| Boric acid | 40 |
| Ammonium Thiosulphate | 100 |
| Magnesium chloride | 20 |
| A water-based acrylic resin solution further comprising styrene, acrylic acid, hydroxymethylacrylate, ethylene glycol, dimethylaminoethanol, ammonia, and water | 75 |
| Carrier water | 705 |

4. A fire retardation and wood preservation composition comprising the following ingredients in the approximate amounts indicated:

| Compound | Parts by weight per thousand |
|---|---|
| Borax | 60 |
| Boric acid | 40 |
| Urea | 100 |
| Triethylamine | 10 |
| A water-based acrylic resin solution further comprising styrene, acrylic acid, hydroxymethylacrylate, ethylene glycol, dimethylaminoethanol, ammonia, and water | 100 |
| Carrier water | 690 |

5. A fire retardation and wood preservation composition comprising the following ingredients in the approximate amounts indicated:

| Compound | Parts by weight per thousand |
|---|---|
| Borax | 80 |
| Boric acid | 60 |
| Ammonium Thiosulphate | 50 |
| Triethylamine | 10 |
| A water-based acrylic resin solution further comprising styrene, acrylic acid, hydroxymethylacrylate, ethylene glycol, dimethylaminoethanol, ammonia, and water | 70 |
| Carrier water | 730 |

6. A fire retardation and wood preservation composition comprising the following ingredients in the approximate amounts indicated:

| Compound | Parts by weight per thousand |
|---|---|
| Borax | 80 |
| Boric acid | 60 |
| Triethylamine | 10 |
| A water-based acrylic resin solution further comprising styrene, acrylic acid, hydroxymethylacrylate, ethylene glycol, dimethylaminoethanol, ammonia, and water | 100 |
| Carrier water | 750 |

7. A fire retardation and wood preservation composition comprising the following ingredients in the approximate amounts indicated:

| Compound | Parts by weight per thousand |
|---|---|
| Borax | 60 |
| Boric acid | 30 |
| Ammonium Polyphosphate | 100 |
| A water-based acrylic resin solution further comprising styrene, acrylic acid, hydroxymethylacrylate, ethylene glycol, dimethylaminoethanol, ammonia, and water | 60 |
| Carrier water | 750 |

8. A fire retardation and wood preservation composition comprising the following ingredients in the approximate amounts indicated:

| Compound | Parts by weight per thousand |
|---|---|
| Borax | 80 |
| Boric acid | 60 |
| Magnesium chloride | 40 |
| Triethylamine | 10 |
| A water-based acrylic resin solution further comprising styrene, acrylic acid, hydroxymethylacrylate, ethylene glycol, dimethylaminoethanol, ammonia, and water | 75 |
| Carrier water | 735 |

9. A fire retardation and wood preservation composition comprising the following ingredients in the approximate amounts indicated:

| Compound | Parts by weight per thousand |
|---|---|
| Boric acid | 100 |
| Triethylamine | 10 |
| A water-based acrylic resin solution further comprising styrene, acrylic acid, hydroxymethylacrylate, ethylene glycol, dimethylaminoethanol, ammonia, and water | 100 |
| Carrier water | 790 |

* * * * *